Dec. 3, 1963  R. MALCOM, JR  3,112,490
FILTER PLATE ASSEMBLY FOR WELDING HELMETS AND THE LIKE
Filed Sept. 19, 1960  2 Sheets-Sheet 1
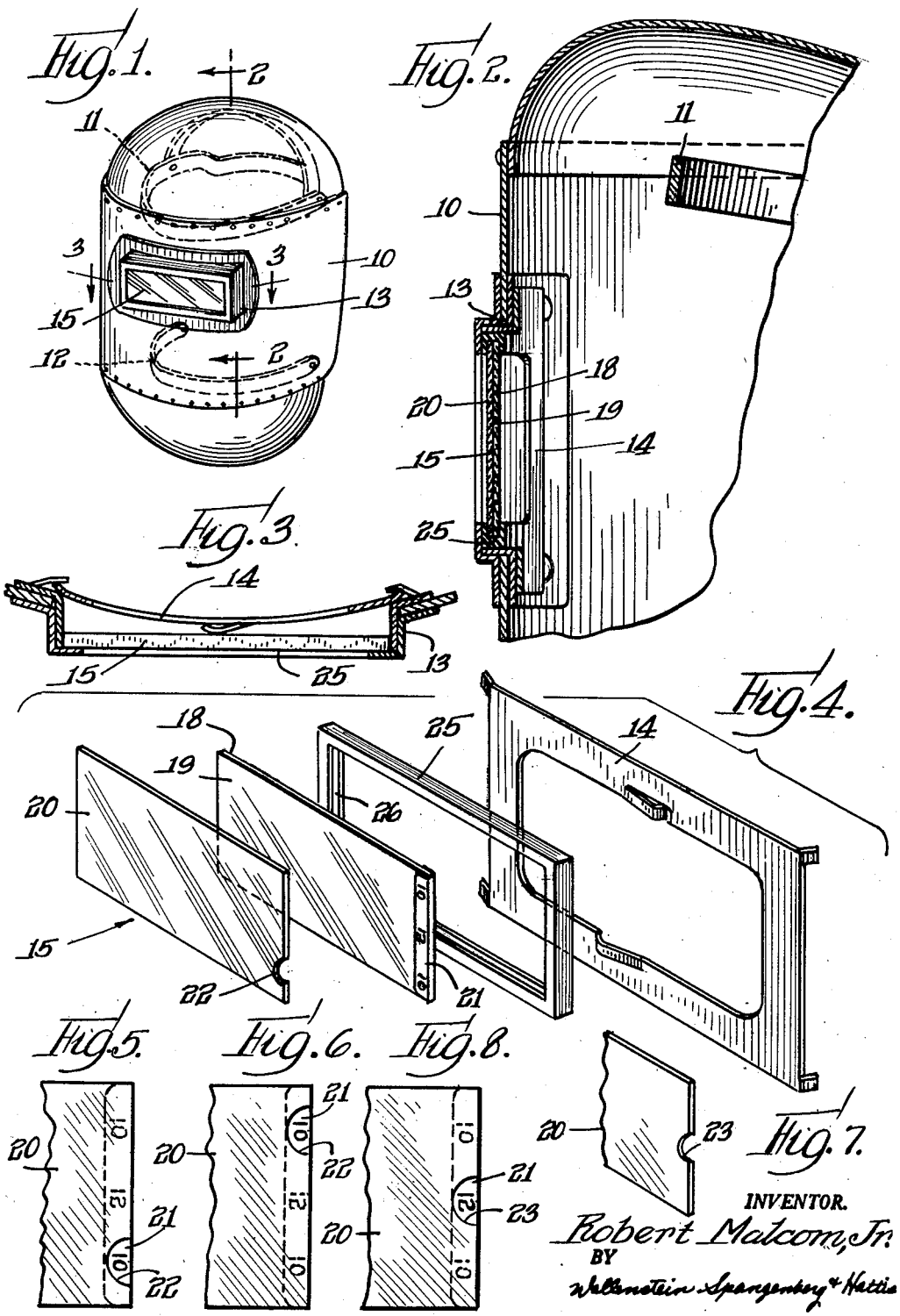
INVENTOR.
Robert Malcom, Jr.

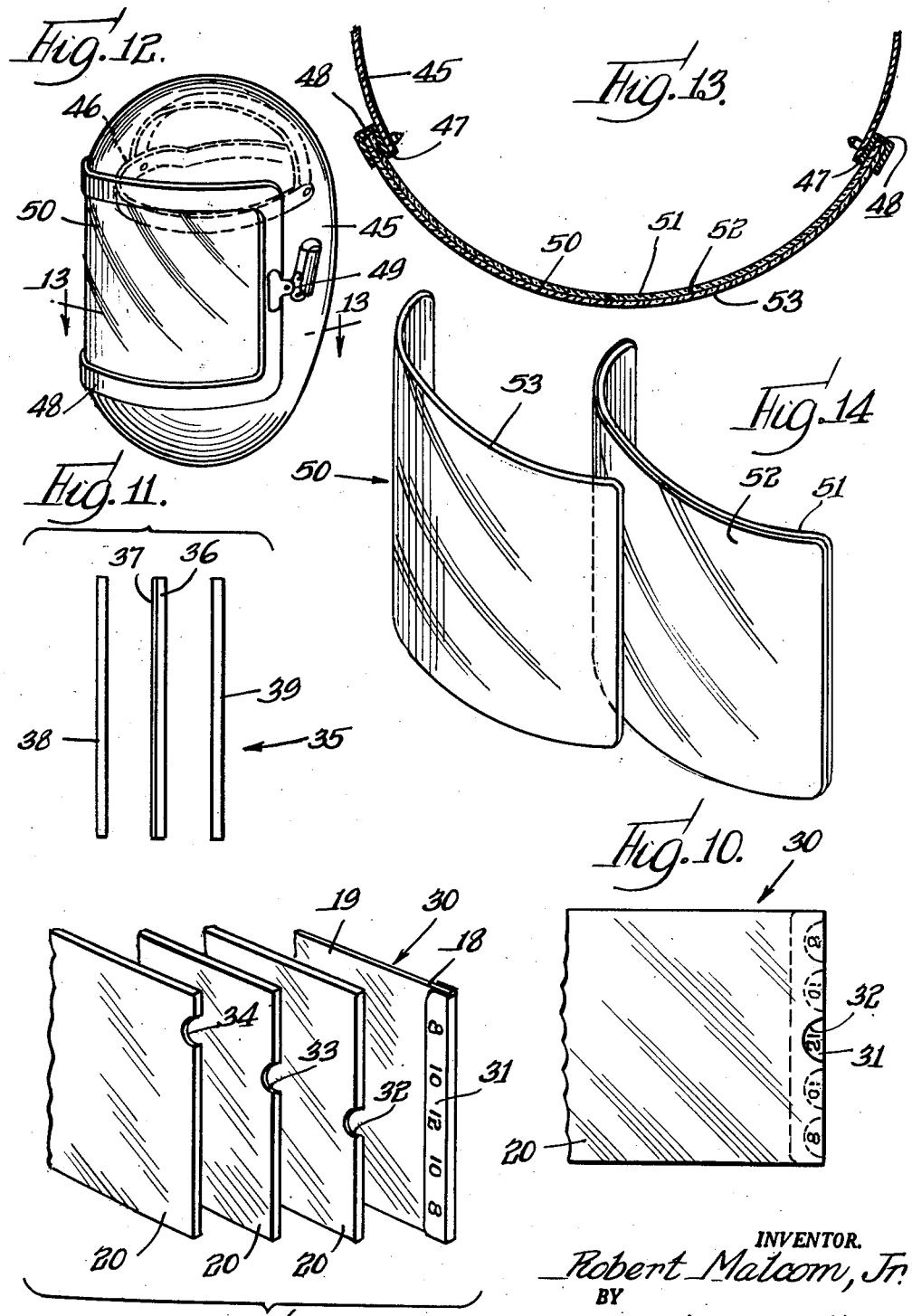

United States Patent Office 3,112,490
Patented Dec. 3, 1963

3,112,490
FILTER PLATE ASSEMBLY FOR WELDING
HELMETS AND THE LIKE
Robert Malcom, Jr., 232 Howard Drive, Belleair Beach,
Indian Rocks Beach, Fla.
Filed Sept. 19, 1960, Ser. No. 56,781
4 Claims. (Cl. 2—8)

The principal object of this invention is to provide an improved filter plate assembly for welding helmets and the like, wherein desired selected shade values for visible rays may be readily obtained, wherein at least a corresponding safe shade value for infrared and ultraviolet rays is assured, and wherein indicating means are provided for indicating the desired selected shade values for visible rays.

Filter plates for welding helmets or the like are designated by shade values in accordance with the amount of visible rays filtered thereby, as for example, shade Nos. 6, 8, 10, 12, 14 and the like. The various shade values of the filter plates and the percents of transmission of visible rays, infrared rays and ultraviolet rays therethrough are set forth and tabulated in Federal Specification GGG–H–211a, issued February 9, 1955, shade values from 2 to 14 being set forth therein. Generally, the percents of transmission of visible rays, infrared rays and ultraviolet rays decrease with increasing shade values, the filtering of visible rays being accomplished principally by color pigments or dies in the filter plates. Also, the filter plates of each shade value are required to filter out certain amounts of injurious infrared and ultraviolet rays, respectively, this being accomplished principally by the compositions of the filter plates, such as special kinds of glass. As a result, the filter plates are relatively expensive and stocking and inventory problems become quite acute.

In accordance with the instant invention, these problems are greatly minimized, and there is provided a simple and inexpensive filter plate assembly wherein desired selected shade values are readily obtained with maximum protection against the injurious infrared and ultraviolet rays, all without the need for special glass compositions and large inventories.

Briefly, the filter plate assembly of this invention comprises a superimposed stack of at least two synthetic plastic transparent plates, wherein the surface of one of said plates has a thin film of metal, such as gold, deposited thereon for filtering principally infrared and ultraviolet rays and also visible rays and wherein at least another of said plates is colored for filtering principally visible rays and also infrared and ultraviolet rays.

For example, the master plate having the thin metal film thereon, which also may be colored, may correspond to shade 6 for visible rays and to an extremely safe shade 12 for infrared and ultraviolet rays. The other auxiliary colored plate may have a shade value for visible rays so that when it is superimposed on the master plate, the resultant shade value for visible rays is 10, or it may have shade values such that the resultant shade values would be 8 or 12 or the like. In this way, desired selected auxiliary plates may be superimposed on the master plate to provide any desired selected ultimate shade values for visible rays, and at the same time there is always complete protection against the injurious infrared and ultraviolet rays since the effective shade value for such rays is at least 12.

Preferably, indicating means are provided for indicating the ultimate shade of the stack of plates, this being accomplished by placing spaced indicia along one edge of the master plate for the desired ultimate shades, and by providing spaced notches along the edges of the auxiliary plates which cooperate with the indicia for indicating the resultant ultimate shade for visible rays. Means are also preferably provided for securing together the plates in the stack, and this means preferably includes a resilient rubber like frame having a groove for marginally receiving the plates. The plates of the stack may be flat so as to be mounted in a flat sight opening in the welding helmet or the like, or they may be curved for mounting in a curved sight opening. They may also be of any desired size and shape, as for example, the standard 2" x 4½" size, or a larger 4¼" x 5½" size, or a still larger 7" x 11" curved size.

Further objects of this invention reside in the details of construction of the filter plate assembly and in the cooperative relationships between the component parts thereof.

Other objects and advantages of this invention will become apparent to those skilled in the art upon reference to the accompanying specification, claims and drawings in which:

FIG. 1 is a perspective view of one form of a welding helmet having the filter plate assembly of this invention incorporated therein;

FIG. 2 is a vertical sectional view taken substantially along the line 2—2 of FIG. 1;

FIG. 3 is a horizontal sectional view taken substantially along the line 3—3 of FIG. 1;

FIG. 4 is an exploded perspective view of one form of the filter plate assembly of this invention which is utilized in the welding helmet of FIG. 1;

FIGS. 5 and 6 are partial elevational views showing the manner of stacking the filter plates of the assembly;

FIG. 7 is a partial perspective view of another auxiliary filter plate;

FIG. 8 is a partial elevational view showing the stacking of the auxiliary plate of FIG. 7 with the master plate;

FIG. 9 is an exploded perspective view of another form of the filter plate assembly of this invention;

FIG. 10 is a view illustrating the stacking of the filter plates of FIG. 9;

FIG. 11 is an end elevational view of a further form of the filter plate assembly of this invention;

FIG. 12 is a perspective view of another form of welding helmet illustrating a filter plate assembly of this invention incorporated therein;

FIG. 13 is a horizontal sectional view taken substantially along the line 13—13 of FIG. 12; and FIG. 14 is an exploded perspective view of the filter plate assembly as utilized in the helmet of FIGS. 12 and 13.

Referring now to FIGS. 1 to 3, a conventional welding helmet is designated at 10, it including a head piece 11, a chin guard 12 and a sight opening frame 13 which may be of the standard 2" x 4½" size. A spring clip 14 operates to secure the filter plate assembly 15 of this invention in the sight opening frame 13.

One form of the filter plate assembly 15 of this invention is shown in more detail in FIGS. 4 to 8. Here the filter plate assembly 15 includes a pair of synthetic plastic transparent plates 18 and 20, these plates being colored by means of suitable pigments or dyes for the purpose of filtering visible rays. The amount of filtering of visible rays depends upon the density and coloring of the plates. The plates are preferably formed of a synthetic plastic material which is capable of vacuum plating, as for example, catalytic setting resins such as CR 39 of Pittsburgh Plate Glass Company, epoxy resins or the like. One surface of the synthetic plastic plate 18 has a thin film 19 of metal, such as gold, deposited thereon as by vacuum plating or the like. This metallic film 19 operates principally by reflection to filter principally infrared and ultraviolet rays and also some of the visible rays. For purposes of illustration herein, the master plate 18 with its thin metallic film 19 has a shade value for visible rays corresponding to shade No. 6 and a shade value for infrared and ultraviolet rays corresponding to a shade No. 12. One edge of the master plate 18 is provided with an indicia strip 21 having suitable shade number indicia thereon, as for example No. 12 in the center and No. 10 spaced on each side of the center. The auxiliary plate 20 has such density and coloring so that when it is superimposed over the master plate 18, the superimposed master and auxiliary plates provide an ultimate shade value for visible rays corresponding to shade No. 10. Preferably the auxiliary plate 20 is superimposed over the side of the master plate 18 having the metallic film 19 so that it also operates to protect the metallic film. The auxiliary plate 20 is provided along one of its edges with a notch 22, the position of this notch being dependent upon the amount of filtering of visible rays afforded by that auxiliary plate. When this auxiliary plate 20 is superimposed over the master plate 18, the notch 22 is aligned with indicia No. 10 on the master plate 18 which clearly indicates that the effective shade of the superimposed plates is shade No. 10. The auxiliary plate 20 may be superimposed as illustrated in FIG. 5 or as illustrated in FIG. 6 and in both instances the proper shade No. 10 is indicated.

FIG. 7 illustrates another auxiliary plate 20 having a central notch 23, this plate having a density and color so that when it is superimposed over the master plate 18, the superimposed plates provide a shade value for visible rays corresponding to shade No. 12. The notch 23 in the auxiliary plate 20 cooperates with indicia No. 12 for indicating the resultant shade value. Whether either the auxiliary plate 20 of FIG. 4 or the auxiliary plate 20 of FIG. 7 is superimposed over the master plate 18 to give shade numbers for visible rays of No. 10 or No. 12, the filtering of the injurious infrared and ultraviolet rays is at the safe high value corresponding at least to a shade No. 12.

The master plate 18 and the auxiliary plate 20 are removably secured together in a stack by means of a resilient rubber-like frame 25 having a groove 26 which marginally receives the edges of the plates 18 and 20. In addition, the resilient rubber-like frame also acts as a sealing gasket when the filter plate assembly is removably mounted in the sight opening frame 13 of the helmet illustrated in FIGS. 1 to 3.

Referring now to FIGS. 9 and 10, there is illustrated a further adaption of the filter plate assembly heretofore described. Here the filter plate assembly is designated at 30 and the master plate 18 having the metal film 19 thereon is provided with an indicia strip 31 having spaced indicia Nos. 8, 10 and 12 arranged therealong. In this adaptation three auxiliary plates 20 may be utilized for selective superimposition on the master plate 18, these plates being provided with spaced notches 32, 33 and 34 respectively. These auxiliary plates 20 have densities and colors which correspond to the respective positions of the notches 32, 33 and 34. Thus, when any of these plates are selected and superimposed over the master plate 18, the corresponding resultant or ultimate shade value for visible rays is appropriately indicated. Accordingly, the arrangement of FIGS. 9 and 10 differs from the arrangement of FIGS. 4 to 8 in that the former provides greater selection than the latter. Of course, this could be carried on still further so as to provide still greater degrees of selection.

Referring now to FIG. 11, a still further adaptation of the filter plate assembly of this invention is generally designated at 35. Here the synthetic plastic transparent master plate 36 is made clear and is provided with a thin metallic film 37 for filtering principally the infrared and ultraviolet rays and also some visible rays. Auxiliary synthetic plastic colored transparent plates 38 and 39 are superimposed over each side of the master plate 36, these auxiliary plates 38 and 39 operating to filter principally the visible rays and some infrared and ultraviolet rays. The resultant filtering of the visible rays and hence the shade value for visible rays of the assembly is dependent principally upon the density and coloring of the auxiliary plates 38 and 39 and by proper selection of the auxiliary plates substantially any desired shade value for visible rays may be maintained. Here also there is extremely safe filtering of the injurious infrared and ultraviolet rays by the master plate 36 having the metallic film 37. The arrangement of FIG. 11 may also be provided with suitable indicia and notches for indicating the shade values of the assembly.

Referring now to FIG. 12, there is illustrated another form of welding helmet which may correspond to the welding helmet shown and described in my copending application serial No. 846,171, filed October 13, 1959, now U.S. Patent No. 3,050,736. Briefly it includes a helmet portion 45 having a head piece 46 and a curved sight opening 47. A removable curved frame 48 is detachably secured to the helmet by suitable locks 49. The curved frame carries a curved filter plate assembly 50 which is shown in more detail in FIGS. 13 and 14. Here, as in the other forms of the invention, there is provided a synthetic plastic transparent plate 51 having a thin metallic film 52 thereon and a synthetic plastic colored transparent plate 53. This arrangement operates in the same way as the aforementioned arrangements and produces the same results. The essential difference here is that the transparent synthetic plastic plates 51 and 53 are curved so as to fit into the curved frame 48 for the curved sight opening of the helmet 45. Here also the curved synthetic plastic plates 51 and 53 are of a larger size, as for example 7" x 11". The plates 51 and 53 may be formed curved or they may be flat and resiliently flexible so as to be curved when they are placed in the frame 48. The plates 51 and 53 may also be provided with suitable indicia and notches for indicating the ultimate shade value of the assembly and more than two plates may be utilized, as for example, as in FIG. 11.

While for purposes of illustration several forms of this invention have been disclosed, other forms thereof may be apparent to those skilled in the art upon reference to this disclosure and, therefore, this invention should be limited only by the scope of the appended claims.

I claim as my invention:

1. A filter plate assembly for welding helmets and the like comprising, a transparent synthetic plastic master plate having a thin film of metal deposited thereon for filtering principally infrared and ultraviolet rays and also visible rays and having a predetermined high safe shade value for infrared and ultraviolet rays and a predetermined lower shade value for visible rays, said master plate having spaced apart indicia arranged along one edge thereof respectively indicating desired ultimate shades for visible rays, a plurality of transparent synthetic plastic colored auxiliary plates for filtering principally visible rays and also infrared and ultraviolet rays, said auxiliary plates having respectively different predetermined shade values for visible rays and having notches spaced along one edge thereof respectively in accordance with their said different shade value, said master and selected ones of said auxiliary plates upon superimposition providing a selected ultimate shade value for visible rays and at least said predetermined high safe shade value for infrared and ultraviolet rays, and said notches in said selected auxiliary plates cooperating with the indicia on the master plate for indicating the ultimate shade value for visible rays provided by the superimposed master and selected auxiliary plates.

2. A filter plate assembly for insertion as a unit in the sight opening frame of a welding helmet and the like comprising, a transparent synthetic plastic master plate having a thin film of metal deposited thereon for filtering principally infrared and ultraviolet rays and also visible rays and having a predetermined high safe shade value for infrared and ultraviolet rays and a predetermined lower shade value for visible rays, a plurality of transparent synthetic plastic colored auxiliary plates for filtering principally visible rays and having respectively different predetermined shade values for visible rays, selected ones of said auxiliary plates being superimposed over said master plate to provide a desired selected ultimate shade value for visible rays and at least said predetermined high safe shade value for infrared and ultraviolet rays, and a resilient rubber-like frame having a channel groove for marginally receiving said plates in said superimposed position and removably securing them together as a unit for insertion in the sight opening frame of the welding helmet and the like.

3. A filter plate assembly for welding helmets and the like comprising, a transparent synthetic plastic master plate having a thin film of metal deposited thereon for filtering principally infrared and ultraviolet rays and also visible rays and having a predetermined high safe shade value for infrared and ultraviolet rays and a predetermined lower shade value for visible rays, and a plurality of transparent synthetic plastic colored auxiliary plates for filtering principally visible rays and having respectively different predetermined shade values for visible rays, selected ones of said auxiliary plates being superimposed over said master plate to provide a desired selected ultimate shade value for visible rays and at least said predetermined high safe shade value for infrared and ultraviolet rays, and said auxiliary plates having means thereon for indicating the ultimate shade value for visible rays provided by the superimposed master and selected auxiliary plates.

4. A filter plate assembly for insertion as a unit in the sight opening frame of a welding helmet and the like comprising, a transparent synthetic plastic master plate having a thin film of metal deposited thereon for filtering principally infrared and ultraviolet rays and also visible rays and having a predetermined high safe shade value for infrared and ultraviolet rays and a predetermined lower shade value for visible rays, a plurality of transparent synthetic plastic colored auxiliary plates for filtering principally visible rays and having respectively different predetermined shade values for visible rays, selected ones of said auxiliary plates being superimposed over said master plate to provide a desired selected ultimate shade value for visible rays and at least said predetermined high safe shade value for infrared and ultraviolet rays, said auxiliary plates having means thereon for indicating the ultimate shade value for visible rays provided by the superimposed master and selected auxiliary plates, and means for marginally removably securing together said superimposed master and selected auxiliary plates as a unit for insertion as a unit in the sight opening frame of the welding helmet and the like.

References Cited in the file of this patent
UNITED STATES PATENTS

| | | |
|---|---|---|
| 2,087,802 | DeBayer-Krucsay | July 20, 1937 |
| 2,145,974 | Dockson | Feb. 7, 1939 |
| 2,152,383 | Leader | Mar. 28, 1939 |
| 2,186,817 | Bowers | Jan. 9, 1940 |
| 2,469,810 | Bowers | May 10, 1949 |
| 2,750,832 | Morgan | June 19, 1956 |
| 2,793,964 | Gilbert et al. | May 28, 1957 |
| 2,801,188 | Minsk | July 30, 1957 |
| 2,854,349 | Dreyfus et al. | Sept. 30, 1958 |
| 2,907,672 | Irland et al. | Oct. 6, 1959 |
| 2,913,350 | Upton | Nov. 17, 1959 |
| 2,917,439 | Liu | Dec. 15, 1959 |
| 3,012,906 | Anspon | Dec. 12, 1961 |

OTHER REFERENCES

German printed application D 19944, Aug. 2, 1956 (Durst).